US006912550B2

(12) United States Patent
Zhang et al.

(10) Patent No.: US 6,912,550 B2
(45) Date of Patent: Jun. 28, 2005

(54) FILE CLASSIFICATION MANAGEMENT SYSTEM AND METHOD USED IN OPERATING SYSTEMS

(75) Inventors: Li Zhang, Beijing (CN); Liping Yang, Beijing (CN); Yue Pan, Beijing (CN); Dong Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 10/063,166

(22) Filed: Mar. 27, 2002

(65) Prior Publication Data

US 2002/0143797 A1 Oct. 3, 2002

(30) Foreign Application Priority Data

Mar. 29, 2001 (CN) .......................................... 01112130 A

(51) Int. Cl.⁷ .............................................. G06F 17/30
(52) U.S. Cl. ...................... 707/200; 707/100; 707/102; 707/104.1; 707/204; 709/224; 709/232
(58) Field of Search ........................... 707/5, 6, 8, 201, 707/206, 2–4, 10, 100, 102, 104.1, 204; 709/224, 232

(56) References Cited

U.S. PATENT DOCUMENTS

| | | | |
|---|---|---|---|
| 5,201,047 A | * | 4/1993 | Maki et al. ...................... 707/4 |
| 5,742,816 A | | 4/1998 | Barr et al. ................... 395/615 |
| 5,761,655 A | | 6/1998 | Hoffman ........................ 707/4 |
| 5,848,409 A | | 12/1998 | Ahn ................................ 707/3 |
| 5,920,864 A | * | 7/1999 | Zhao ............................ 707/10 |
| 5,937,422 A | | 8/1999 | Nelson et al. ............... 707/531 |
| 6,038,561 A | | 3/2000 | Snyder et al. .................. 707/6 |
| 6,041,331 A | | 3/2000 | Weiner et al. ............... 707/103 |
| 6,052,693 A | | 4/2000 | Smith et al. ................. 707/104 |
| 6,055,540 A | | 4/2000 | Snow et al. .................. 707/103 |
| 6,076,088 A | | 6/2000 | Paik et al. ..................... 707/5 |
| 6,078,924 A | | 6/2000 | Ainsbury et al. ........... 707/101 |
| 6,094,649 A | | 7/2000 | Bowen et al. .................. 707/3 |
| 6,098,066 A | | 8/2000 | Snow et al. .................... 707/3 |
| 6,101,515 A | | 8/2000 | Wical et al. ................. 707/531 |
| 6,112,201 A | | 8/2000 | Wical ............................. 707/5 |
| 6,216,228 B1 | * | 4/2001 | Chapman et al. ........... 713/176 |
| 6,363,174 B1 | * | 3/2002 | Lu ............................. 382/209 |
| 6,519,612 B1 | * | 2/2003 | Howard et al. ............. 707/200 |
| 6,564,202 B1 | * | 5/2003 | Schuetze et al. ............... 707/2 |
| 6,621,930 B1 | * | 9/2003 | Smadja ....................... 382/224 |
| 6,625,617 B2 | * | 9/2003 | Yarnall et al. ........... 707/104.1 |

* cited by examiner

*Primary Examiner*—Charles Rones
*Assistant Examiner*—Jacques Veillard
(74) *Attorney, Agent, or Firm*—Scully, Scott, Murphy & Presser; Richard Lau, Esq.

(57) ABSTRACT

The invention provides a file classification management system and method used in operating systems for managing the files by categories. Each of the physically stored files is mapped into one or more logical categories based on the contents of the file. And a desktop files resource manager presents the files by categories organized in a tree structure such that the user can directly find desired files via categories by using the present invention. The invention significantly improves the function of the file system and makes the file management interface more friendly.

30 Claims, 5 Drawing Sheets

FILE CLASSIFICATION MANAGEMENT SYSTEM AND METHOD USED IN OPERATING SYSTEMS

BACKGROUND OF INVENTION

1. Technical Field

The invention provides a file classification management system and a file classification management method used in operating systems, especially provides a file classification management and method for managing physical files of the file system in current operating systems by categories.

2. Background of the Invention

With the fast development of the computer and Internet, searching and downloading information resources via Internet has become an important and interesting thing for more and more people, and computers have also been used to manage files.

It is well known that information is generally stored in the computers in a variety of file types. Current operating systems organize the files into a directory tree; all the files relating to a specific application are stored in a directory created by the system or the user. For example, in the Windows operating system, all of the system files are put in a directory named "Windows". Users can put his files in the directory built for himself such as "My Documents". In a file server consisting of large quantity of information, all the files are also located in different directories having the tree structure.

In this way, it is time consuming for a user to find a file of a specific topic, it is worse especially for finding a file from a large file set. In order to find a file, one case is that the user knows the exact content of the file, or he has to browse each file one by one, which is impossible in the real practice.

SUMMARY OF INVENTION

A feature of the present invention includes a file classification management system used in operating systems, said file classification management system is used for managing the files by categories, which is characterized in that, said file classification management system maps each of the physically stored files into one or more logical categories based on the contents of the file.

The file classification management method claimed in the invention includes a file classification step, which is used to categorize a file based on its contents.

Various other objects, features, and attendant advantages of the present invention will become more fully appreciated as the same becomes better understood when considered in conjunction with the accompanying drawings, in which like reference characters designate the same or similar parts throughout the several views.

The detailed description of the embodiment will be discussed in connection with the drawings.

DETAILED DESCRIPTION

Figure 1:
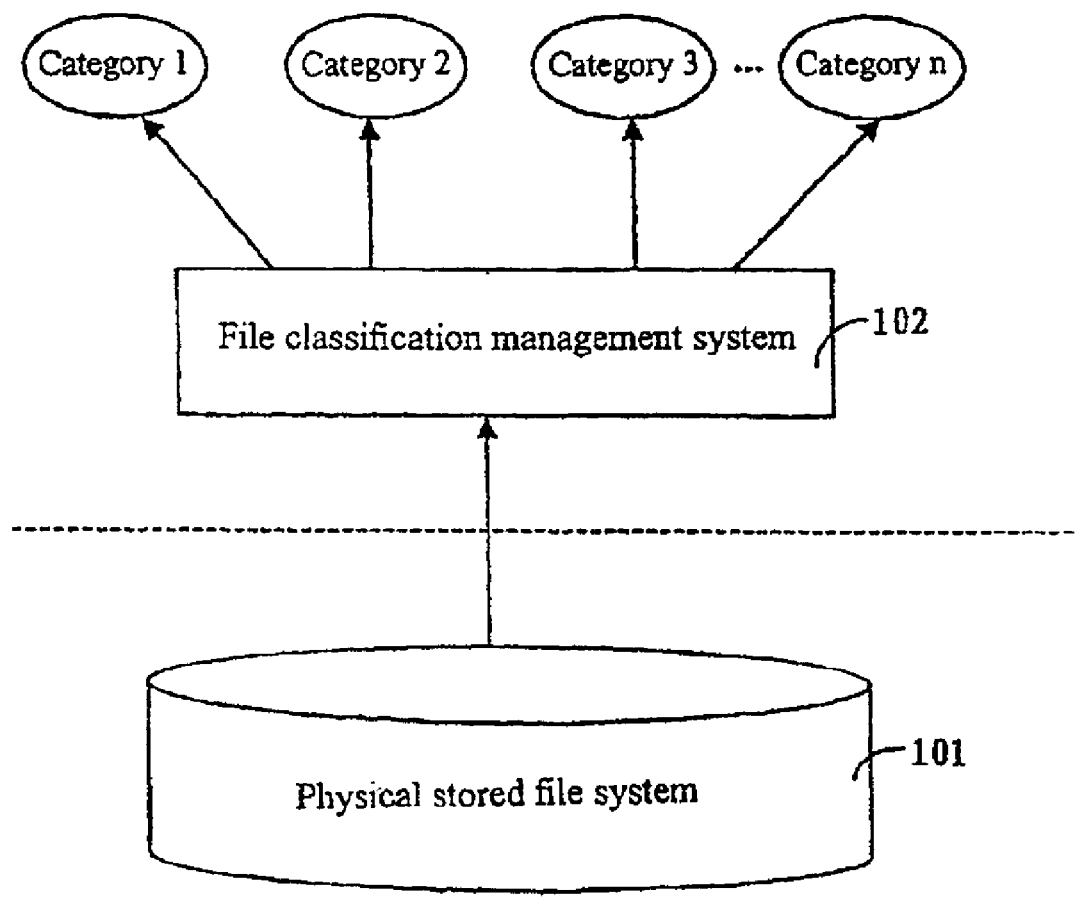
FIG. 1 is the schematic diagram of the file classification management system that is applicable in the operating systems according to the invention.

The invention is to solve the above problem. Its goal is to provide a file classification management system in the operating systems, so that files can be organized based on their contents.

Another goal of the invention is to provide a file classification management method in the operating system to organize the files based on their contents.

Another goal of the invention is to provide a device and a method for classifying files based on their contents.

Another goal of the invention is to provide a desktop file resource manager and a file browsing management method in the operating systems for browsing files by categories.

Another goal of the invention is to provide a category addition means and a category addition method that can add new categories and their classification standards.

In order to realize above goals, the invention provides a file classification management system in the operating system. The file classification management system can be used to manage files by categories, it is characterized in that: the file classification management system maps the physically stored file to one or more logical categories for management based on its content.

The file classification management system claimed in this application includes file classification device, which is to do classification based on the file content; classifier, which stores the standards used by the classification device to decide the category of the file; file classification mapping database, which is used to store the classification results.

The classification device claimed in this application includes: file information extraction means, which is used to extract the file type and content-related information from the file to be classified; file information analysis means, which is used to analyze the extracted information; file classification means, which is used to provide the analysis result to the classifier which matches the file with each category to find one or more optimal matching results and then stores the results into the file classification mapping database.

The file classification management system of operating systems claimed in the invention also includes a desktop file resource manager; said desktop file resource manager displays each of the categories and the file information of all files belonging to the corresponding category in a tree structure.

The file classification management system claimed in the invention also includes a category addition means, which is used to add new category and its classification standard.

The invention also provides a file classification management method used in operating systems. Said file classification management method is used to manage the files by categories, it is characterized in that: the physically stored file is mapped to one or more logical categories based on its content.

The file classification step includes the following sub-steps: extracting file type and content-related information from the file to be classified; analyzing the above extracted information; matching the analysis result with classification standard of each category stored in the classifier and finding one or more optimal categories and then storing the classification results into the file classification mapping database.

The file classification management method claimed in the invention further includes the step of a desktop file resource management in the operating systems, which is used to display each of the categories and the information of all files of the corresponding category in the format of a category tree structure.

The file classification management method claimed in the invention also includes a category addition step, which is used to add new category and its classification standard.

Through the file classification management system and the method in the operating systems claimed in the invention, and through managing and displaying the files by categories based on their contents, users can directly select desired categories to browse, so that the human-computer interface becomes more friendly.

As shown in FIG. 1, it is the schematic diagram of the file classification management system used in operating systems according to the invention. The file classification management system 102 classifies all files in the file system 101 that are stored in the computer's physical devices based on the contents of each of the files, mapping these files into category 1 to category n. The mapping, which is also named classification method, will be described later in detail. From FIG. 1, it is easily shown that, the file classification management system according to the invention in fact has the effect of the interface between users and physical files. By this logical interface, what is displayed to users is files under every logical category, so that users can find desired files directly by categories, and so the file management system is much easier to use and the user computer interface is very friendly and is convenient for use.

In order to implement the file classification management system showed in FIG. 1, the description of its main structure and its functions will be described by reference to FIGS. 2 to 5.

Figure 2:
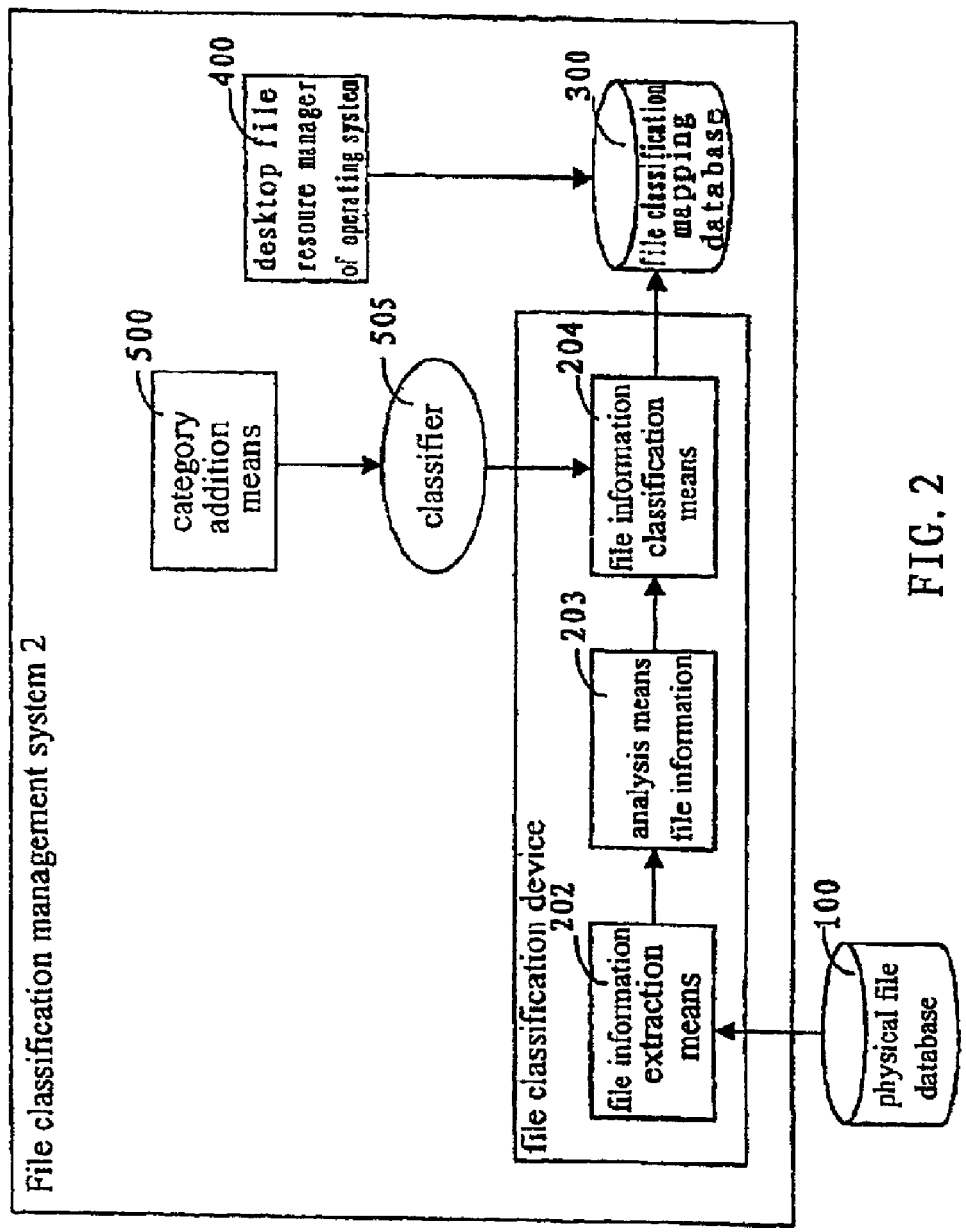
FIG. 2 is the block diagram of one of the embodiments of the file classification management system used in operating systems according to the invention.

FIG. 2 is the main structure blocks of the embodiment of the file classification management system.

The file classification management system 2 includes a file classification device 200, which is to do classification based on the file contents; a file classification mapping database 300, which is used to store the classification results by the file classification device 200; a desktop file resource manager 400 of the operating system, which is used to display each of the files by categories based on their contents; classifier 505, which stores the standards used by the classification device 200 to decide the category of a file; a category addition means 500, which is used to add new category and its classification standard as needed.

As shown in FIG. 2, the physical file database 100 is a physical file system, which is used to store large quantity of physical files in personal computers or file servers. The persons in the art will understand that, all of the files managed by current operating systems can all be regarded as being stored in this physical file database 100.

The file classification device 200 according to the invention includes the following devices:

The file information extraction means 202 extracts text information from the files to be classified that are stored in physical file database 100. Because physical files can be a variety of file types, such as .doc, .pdf, .lwp, zip, etc., in order to get more precise classification result, this file information extraction means 202 firstly detects the file type of the file to be classified and then extracts the text from the original file according to different file format.

The file information analysis means 203, splits the text information that extracted by the file information extraction means 202 to small information unit for later classification. In the embodiment of the invention, because the statistical based classifier will be used to do classification, the file information analysis means 203 splits the text information into independent terms, and then calculates the term frequency of the keywords, and stores the calculated results temporally. Of course, for persons in the art, the functions of the file information analysis means 203 can be designed flexibly according to the classification standards which are used to do classification, for example, if the classification standard is designed based on structured file information, the information got by the file information analysis means 203 will be different from that based on statistical method.

The file information classification means 204 provides the analysis results of the file information analysis means 203 to the classifier 505 which finds one or more optimal categories for the file based on the classification standards it holds, and then the file information classification means 204 stores the file name and its categories into the file classification mapping database 300. Of course, for the convenience of browsing, some other file attributes information are stored at the same time, such as last updated time, file type, file size, etc. In order to speed up the processing time and improve system performance, a secondary database can also be provided, which is used to temporally store small size of data updated or added at specific time to the file classification mapping database 300. It is easy for the persons skilled in the art to implement the secondary database, so the detailed explanation is ignored.

Figure 3:
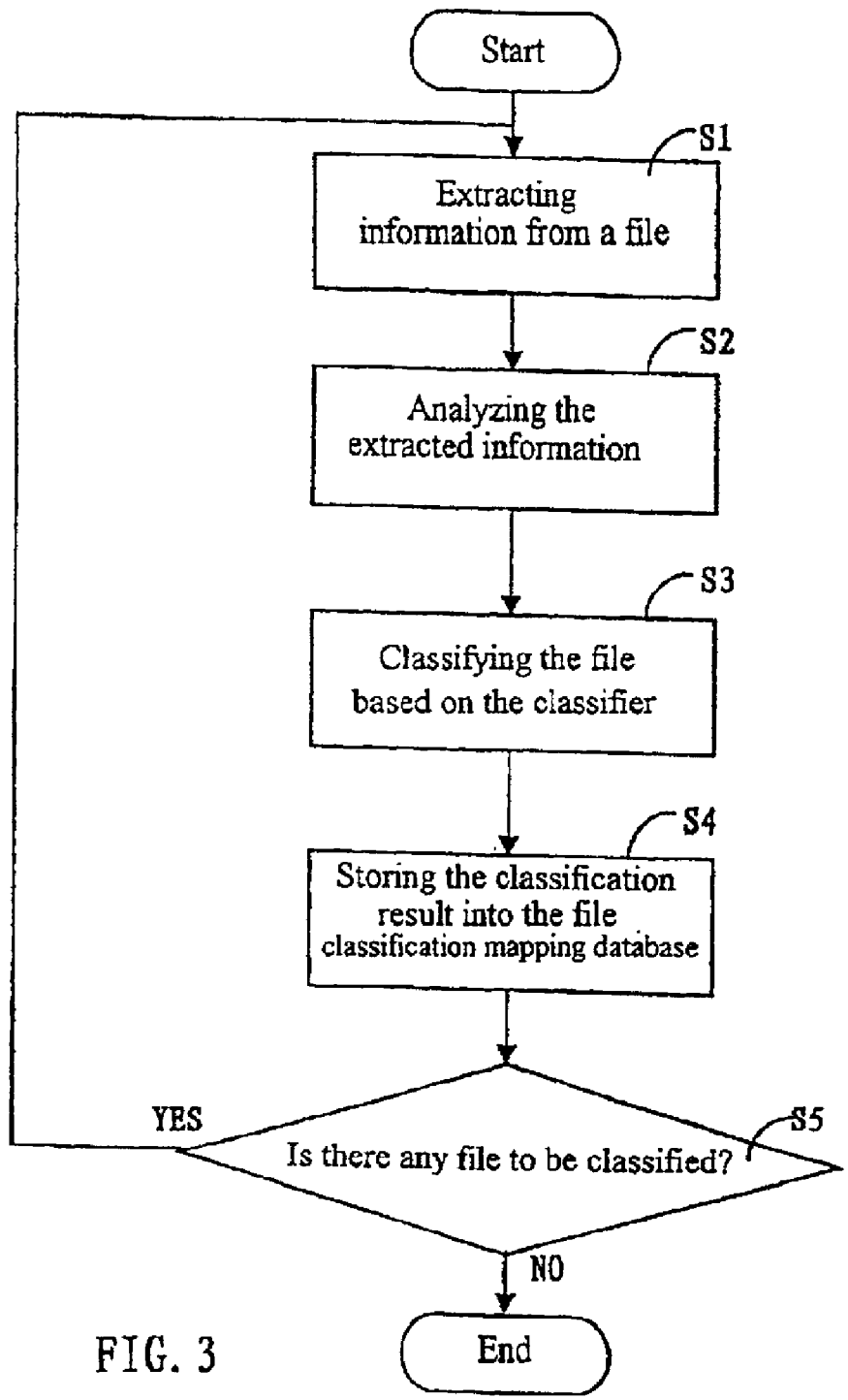
FIG. 3 is the flow chart of the file categorization according to the invention.

FIG. 3 is the flow chart of the file classification process of the file classification device according to the invention.

As shown in the flow chart, at step S1, if there is a file to be classified, the file extraction means 202 will extract information from the file.

Then, at step S2, the file information analysis means 203 splits the extracted information into small units for classification. In the embodiment according to the invention, the extracted information is segmented into words; keywords are counted to get their frequencies in the file.

At step S3, the file information classification means 204 provides the analysis results of step S2, to the classifier 505, which then finds one or more optimal categories for the file. Then at step S4, the file information classification means 204 stores the file name and its categories of the file into the file classification mapping database 300.

At step S5, detecting whether there is other files to be classified or not. If there is, going back to step S1 to continue the processing, or else, finish the classification processing.

After the file classification device 200 categorizes the files in the physical file database 100 and stores the classification results into the file classification mapping database 300, the desktop file resource manager 400 in the operating system will present the categories and sub-categories in the file classification mapping database 300 in a tree structure, and if the user selects a category, all of the files belonging to it and their file information will be displayed in the format of a list.

It is understandable for the persons skilled in the art that the file classification device 200 can also do on-line classification while the desktop file resource manager in the operating systems is browsing files.

Figure 4:
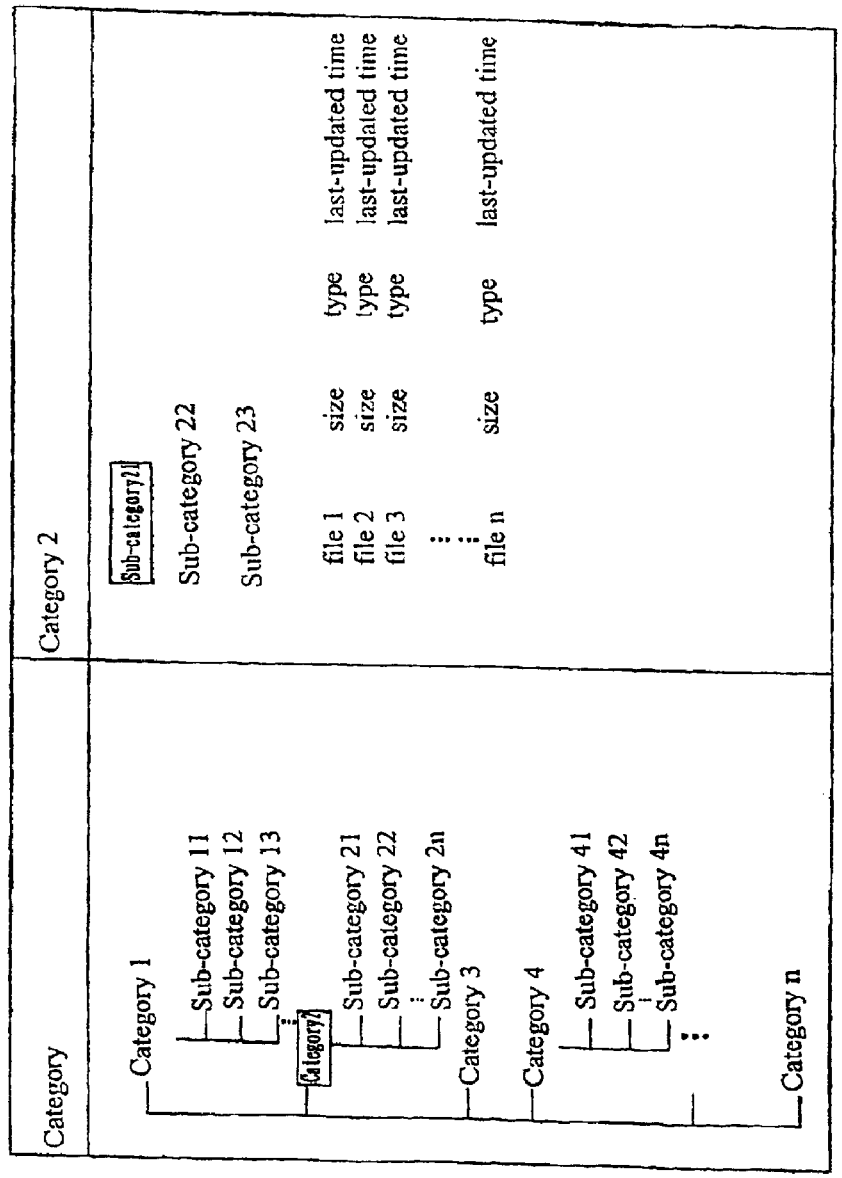
FIG. 4 shows the user interface of the desktop file resource manager of the operating system that displays the files by categories.

FIG. 4 shows how to display files by categories with the desktop file resource manager 400 in the operating systems according to the invention. The desktop file resource manager 400 displays the category information and the information of all files belonging to each of the categories that are stored in the file classification mapping database. As shown in the left of FIG. 4, the desktop file resource manager 400 in the operating systems displays the categories in the file classification mapping database in a tree structure, such as category 1, category 2, . . . , category n, and also displays sub-categories of each category in the tree structure, such as sub-category 11, sub-category 12, . . . , which are sub-categories of category 1. Of course, there may have more sub-categories under each sub-category; this figure doesn't show them in detail.

The right of FIG. 4 shows that when category 2 is selected, the desktop file resource manager 400 will display the sub-categories of category 2, which are category 21, category 22, category 23, and the files of category 2, which are file 1, file 2, . . . , file n, in a list.

Figure 5:
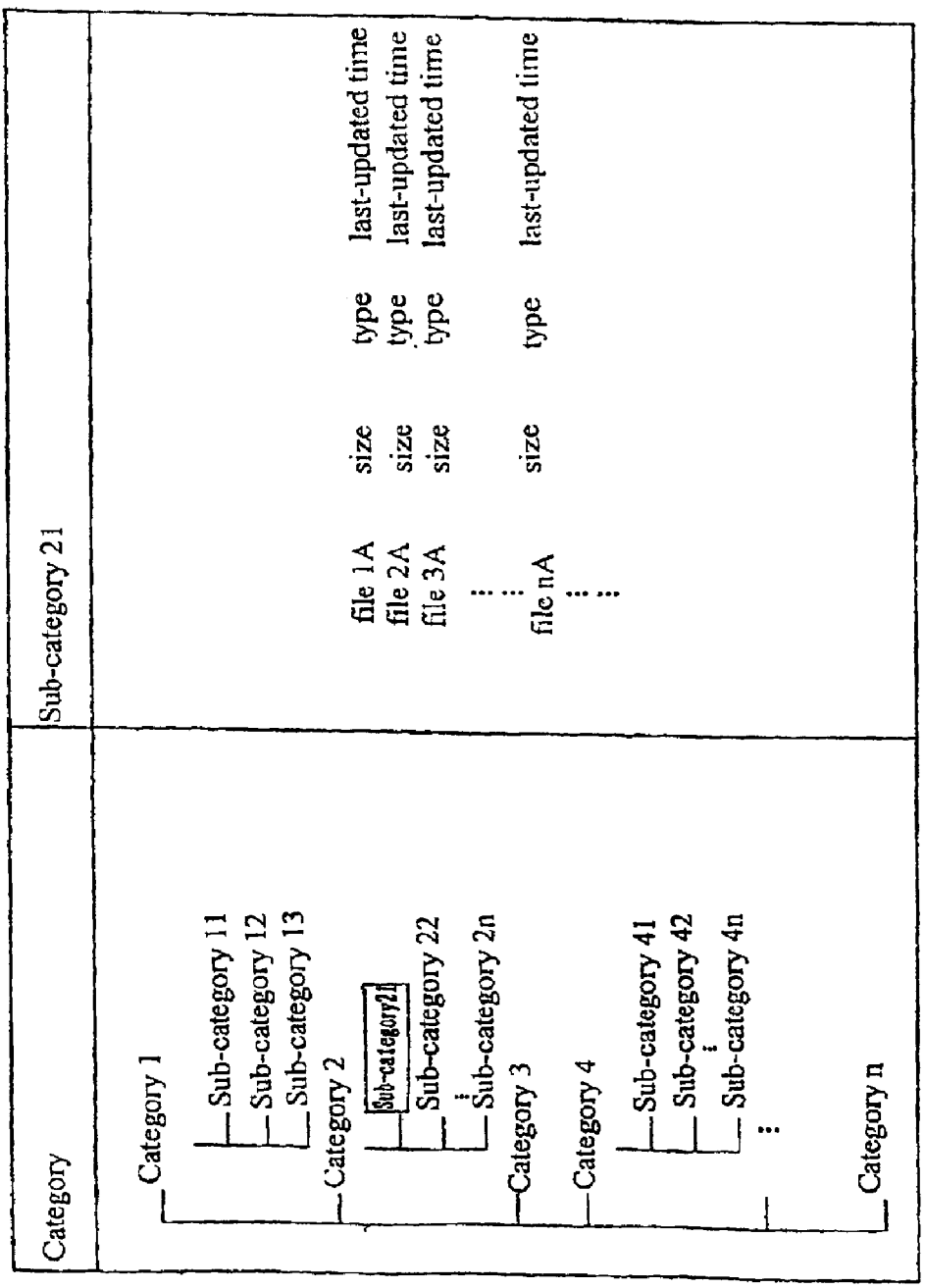
FIG. 5 shows another user interface of the desktop file resource manager of the operating system that displays the files by categories.

As shown in FIG. 5, when sub-category 21 is selected, the file resource manager 400 will display all of the information of the files under category 21.

It is clearly shown by FIG. 4 and FIG. 5 that, the desktop file resource manager in the operating systems enables users directly select the categories of his interest for browsing by presenting files by categories based on their contents, which makes the human computer interface more friendly.

As to the classifier 505, which is described above, the classification standards of it can be built in a different way as needed. In the embodiment in the invention, the statistical classification method is used as the classification standard. The principle of the statistical classification method is that, a statistical classification model and its classification criteria function are designed at first, in which the criteria function parameters are to be set; then, the labeled file samples are analyzed by using the statistical method, the statistical analysis objects include the keywords and their frequencies of the sample set, and then these information are used to adjust the criteria function parameters according to some rule, for example, the minimum classification error rate rule, and finally the classification standard is achieved, including the weight of each keyword in the classifier. When new non-labeled files are to be categorized, the criteria function is computed, if the value is greater than the decision threshold, the file is categorized into the category, if not, the file isn't categorized into the category.

On the other hand, in another embodiment according to the invention, the rule-base method can be used as the classification standard. With this method, the rules can be set manually, or by machine learning. While doing classification, these rules can be used to classify one file to one or more categories.

And users can add new categories and their classification standards in the file classification management system as needed. New categories can be added into classifier 505 by the category addition means 500 that is presented by the invention. Specifically, in the embodiment using the statistical classification method, when a user wants to add a new category, for example, the category of tourism, so that any traveling related files will be classified into this category, what the user needs to do is only to provide several files having travel topic, and then the classifier addition means will do training for this category based on the statistical classification algorithm, the training result will be added into the classifier 505 as a classification standard.

The persons skilled in the art will understand that the category addition means 500 can be freely designed based on different classifier 505.

For example, in the embodiment that the classification standards of the classifier 505 are set manually by user, the implementation of category addition means 500 is very simple, that is to say, the new category and its classification rule are edited by the user.

Another example is that the classification standards of the classifier 505 are set by machine learning, the implementation of category addition means 500 is a little complicated, and the new classifier should be learned by machine learning.

Thus, the file classification management system according to the invention has the ability of learning, so that the users can add new categories as needed.

The file classification management system used in the operating systems according to the invention maps each physically stored file into logical categories based on its content, and displays all of the files under each logical category to users, so that providing a good file management method for the file servers that store large quantity of file data.

The persons skilled in the art can understand that, it is possible to map one physical file to more than two categories with the classification method according to the invention, so that, while retrieving, more aspects of information can be provided to the users.

And, while doing classification, it can follow the classification method presented by the invention; the classification can be done with the classifier presented by the invention. On the other hand, users can classify the files into categories by themselves. The persons skilled in the art can understand that, an selection device can be added to the invention to prompt users select to do auto-classification or manual classification, and the detailed description thereof is ignored.

And the persons skilled in the art can understand that, the category can be hierarchy, that is to say, one category can have more than one level of subcategory.

The invention has been described with the embodiment and attached drawings. However, modification and improvement can be made without departing from the main idea and scope of the invention.

What is claimed is:

1. A classification management system for use in operating systems, said classification management system comprising:

a file classification management system that maps physically stored files into one or more logical categories based on the classifications of the contents of said files including, a file classification device for classifying a file based on its contents;

a classifier for storing classification standards depending on which to classify a file; and a file classification mapping database for storing classified results:

said file classification device including:

a file information extractor for extracting, the file type and content information from the file to be classified, a file information analysis unit for analyzing the extracted information, and a file classification unit for providing the analyzed results to the classifier to find one or more optimal matches, classifying the file intro one or more categories corresponding: to the optimal matches, and storing the classified results into the file classification mapping database.

2. The classification management system according to claim 1, characterized in that said system further includes: a desktop files resource manager of operating systems, which displays the catagories and the files information of all files belonging to each of the catagories organized in a tree structure.

3. The classification management system according to claim 2, characterized in that said file information includes a file name.

4. The classification management system according to claim 3, characterized in that said file information further includes at least one of the file type, file size and last updated time of the file.

5. The classification management system according to claim 1, characterized in that said system includes a selection unit, wherein a file is classified manually when manual classification is selected, and the file is classified automatically when automatic classification is selected.

6. The classification management system according to claim 5, characterized in that said classifier is a statistic classifier which uses a statistic classification algorithm.

7. The classification management system according to claim 5, characterized in that said classifier is a rule-based classifier which uses rule decision.

8. The classification management system according to claim 7, characterized in that said rule is manually set.

9. The classification management system according to claim 7, characterized in that said rule is set through machine learning.

10. The classification management system according to claim 1, characterized in that said system provides for said category to include sub-categories.

11. The classification management system according to claim 1, characterized in that said system further includes a category addition unit for adding a new category and the classification standard corresponding to the new category based on which to classify a file.

12. The classification management system according to claim 11, characterized in that said category addition unit adds the classification standard corresponding to the new category by a statistical classification algorithm.

13. The classification management system according to claim 11, characterized in that said category addition unit adds the classification standard corresponding to the new category by a rule.

14. The classification management system according to claim 13, characterized in that said file is manually set.

15. The classification management system according to claim 13, characterized in that said rule is set through machine learning.

16. A classification management method used in operating systems, said classification management method comprising the steps of:
providing a file classification management system for mapping physically stored files into one or more logical categories based on the contents of said files including,
providing a file classification step for classifying a file based on its contents;
providing a file information extraction substep for extracting the file type and content information from the file to be classified;
providing a file information analysis substep for analyzing the extracted information; and
providing a file classification substep for matching the analyzed results with the categories based on the classification standards prestored, classifying the file into one or more categories corresponding to the optimal matches, and storing the classified results into a file classification mapping database.

17. The classification management method according to claim 16, characterized in that said method further includes the step of:
providing a browsing step that displays the categories and file information of all files belonging to each of the categories organized in a tree structure.

18. The classification management method according to claim 17, characterized in that said method further includes the step of:
providing said file information that includes a file name.

19. The classification management method according to claim 18, characterized said method further includes the step of:
providing said files information with at least one of the file type, file size and last updated time of the file.

20. The classification management method according to claim 16, characterized in that said method further includes the step of:
providing a selection step, wherein a file is classified manually when manual classification is selected, and the file is classified automatically when automatic classification is selected.

21. The classification management method according to claim 20, characterized in that said method further includes the step of:
providing said classification step that uses classification standards set by a statistic classification algorithm.

22. The classification management method according to claim 20, characterized in that said method further includes the step of:
providing said classification step uses classification standards set by means of rules.

23. The classification management method according to claim 22, characterized in that said method further includes the set of:
manually setting said rules.

24. The classification management method according to claim 22, characterized in that said method further includes the step of:
setting said rules through machine learning.

25. The classification management method according to claim 16, characterized in that said method further includes the step of:
providing said category that includes sub-categories.

26. The classification management method according to claim 16, characterized in that said method farther includes the step of:
providing a category addition step for adding a new category and the standard corresponding to the new category based on which to classify a file.

27. The classification management method according to claim 26, characterized in that said method further includes the step of;
providing a step that adds the classification standard corresponding to the new category by using a statistical classification algorithm.

28. The classification management method according to claim 26, characterized in that said method farther includes the step of:
providing a step that adds the classification standard corresponding to a new category by a rule.

29. The classification management method according to claim 28, characterized in that said method farther includes the step of:
manually setting said rule.

30. The classification management method according to claim 28, characterized in that said method further includes the step of:
providing said file through machine learning.

* * * * *